June 14, 1955 T. F. KAESEMEYER, JR., ET AL 2,710,516
PNEUMATIC ATTACHMENT FOR GRAIN HARVESTING MACHINES
Filed Sept. 12, 1952 2 Sheets-Sheet 2

INVENTORS
THEODORE F. KAESEMEYER, JR.
BURTON D. KAESEMEYER,

BY
McMorrow, Berman + Davidson
ATTORNEYS.

United States Patent Office 2,710,516
Patented June 14, 1955

2,710,516

PNEUMATIC ATTACHMENT FOR GRAIN HARVESTING MACHINES

Theodore F. Kaesemeyer, Jr., and Burton D. Kaesemeyer, Pendleton, Oreg.

Application September 12, 1952, Serial No. 309,286

1 Claim. (Cl. 56—158)

This invention relates to grain harvesters and more particularly to pneumatic means for feeding standing grain to the sickle bar of a harvester in replacement of the conventional reel.

It is among the objects of the invention to provide on a grain harvester, mechanism which will direct an air blast against the standing grain in front of the sickle bar of a header type harvester to force grain against the sickle bar and moved the severed heads of the grain onto the grain table at the rear of the sickle bar from which the heads are conveyed to the threshing mechanism of the harvester; which pneumatic mechanism can be easily mounted on an existing harvester with no material modification of the harvester construction and driven by the harvester engine or other power supplying mechanism; which is easily adjustable for grain of different heights and thickness and does not interfere with the passage of the standing grain to the sickle bar; which includes air directing nozzles which may be placed at or even below the level of the sickle bar, if necessary, for very short grain; and which is simple and durable in construction, economical to manufacture, and effective and efficient in operation.

Other objects and advantages will become apparent from a consideration of the following description and the appended claim in conjunction with the accompanying drawings wherein;

Figure 1:
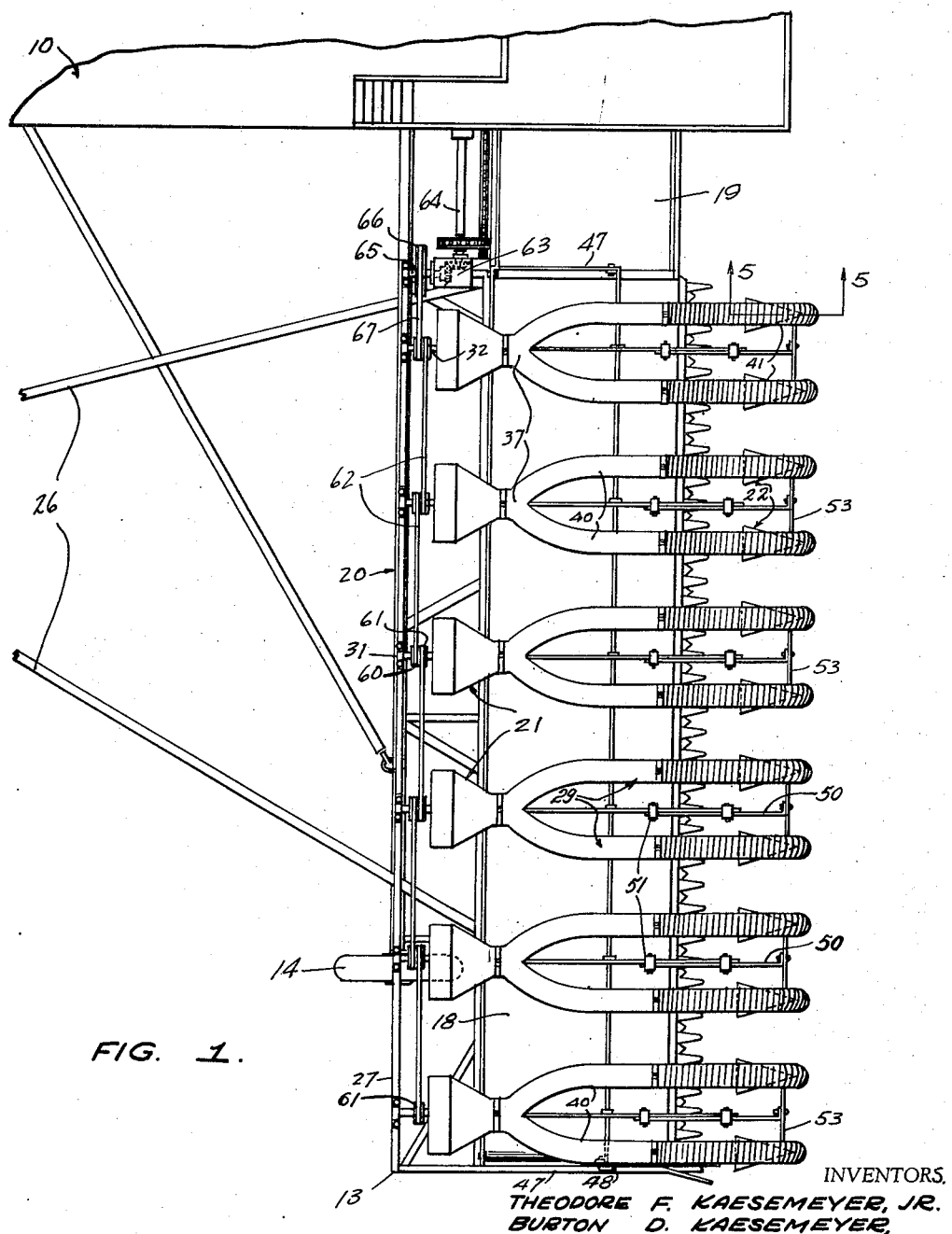
Figure 1 is a fragmentary top plan view of a grain harvester showing the grain cutting mechanism of the harvester equipped with pneumatic grain feeding mechanism illustrative of the invention.
Figure 2:
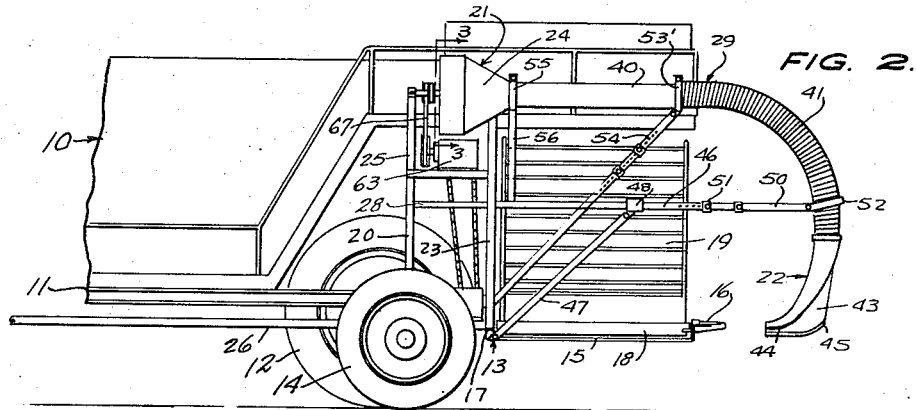
Figure 2 is a fragmentary end elevational view of the harvester and pneumatic grain feeding mechanism illustrated in Figure 1.
Figures 3, 4:
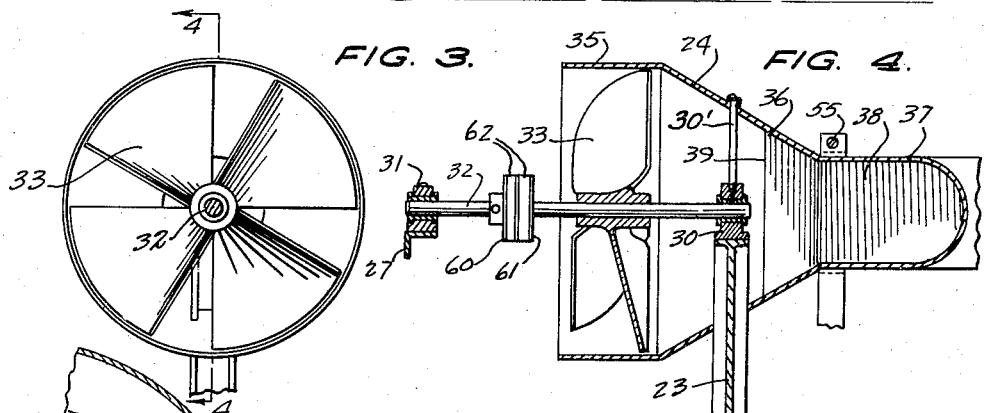
Figure 3 is an enlarged fragmentary cross sectional view on the line 3—3 of Figure 2.
Figure 4 is a fragmentary cross sectional view on the line 4—4 of Figure 3.
Figure 5:
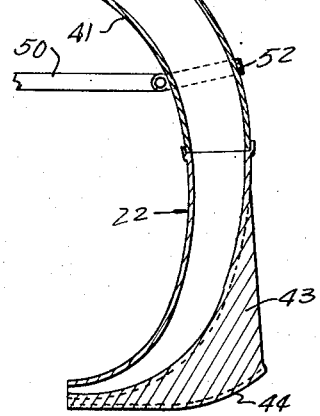
Figure 5 is a fragmentary cross sectional view on an enlarged scale on the line 5—5 of Figure 1.
Figure 6:
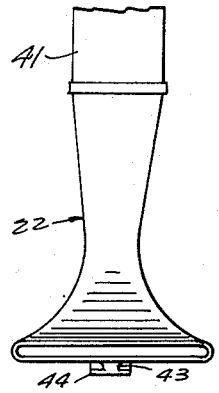
Figure 6 is an enlarged rear elevational view of an air directing nozzle of the pneumatic grain feeding mechanism.
Figure 7:
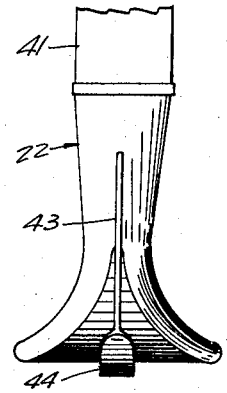
Figure 7 is an enlarged front elevational view of an air directing nozzle of the pneumatic grain feeding mechanism.

With continued reference to the drawings, the harvester, which may be of well known or conventional construction, has a body portion, generally indicated at 10, which includes a frame 11 mounted on wheels 12, only one is shown, and a header mechanism, generally indicated at 13, connected at one end to the body portion of the harvester and extending substantially perpendicularly from one side of the latter. This header mechanism is supported at the end connected to the body portion 10 by the wheels 12 and is supported at its outboard end by a caster wheel mechanism 14.

The header mechanism 13 includes a grain table 15 of elongated, rectangular shape, a sickle bar 16 extending along the front edge of the grain table and a supporting bar 17 extending along the rear edge of the grain table. Rollers, not shown, are mounted one at each end of the grain table and extend transversely thereof and a conveyor belt 18 is trained over these rollers and disposed immediately above the grain table 15 to receive the severed heads of grain from the sickle bar 16 and convey them to the elevator 19 at the inboard end of the header mechanism which elevator carries the heads into the threshing mechanism, not shown, included in the body 10 of the harvester.

The threshing mechanism is powered from a suitable power source, such as an engine, not illustrated, mounted on the harvester frame. The power source is connected to the cutter blade element of the sickle bar 16 by means well known in the art to operate the blade.

As the harvester or header itself may be any one of several forms well known to the art, a more detailed illustration and description is considered unnecessary for the purposes of the present disclosure.

The pneumatic mechanism for directing air blasts from in front of the sickle bar rearwardly over the latter to move the standing grain against the sickle bar and to move the severed heads of the grain onto the conveyor belt 18 of the grain table assembly includes a frame, generally indicated at 20, upstanding from the rear edge of the grain table, a plurality of fans, generally indicated at 21, supported by the frame 20 above the grain table, a plurality of air ducts, generally indicated at 23 extending forwardly and downwardly from the fans 21 and a plurality of air directing nozzles generally indicated at 22, connected one to each air duct at the forward end of the corresponding air duct and disposed in front of and spaced from the sickle bar 16 of the header mechanism.

The frame 20 includes upright members or posts 23 spaced apart longitudinally of the grain table and each connected at its lower end to the rear supporting bar or frame member 17 of the grain table assembly and extending at its upper end through the housing 24 of a corresponding fan. Upstanding rear frame members or posts 25 are secured at their rear ends to the counterbalanced frame structure 26 which is secured at its front end to the rear edge of the frame table and extends rearwardly therefrom to carry a counterbalance weight, not illustrated, spaced rearwardly from the grain table. A horizontal member or top rail 27 is carried on the upper ends of the rear posts 25 and horizontal cross members or braces 28 extend between corresponding front and rear posts of the framework.

Shaft bearings 30 are carried one on each front post 23 at the upper ends of the front posts and shaft bearings 31 are carried on the top rail 27 at spaced apart locations therealong, each bearing 31 on the top rail being in alignment longitudinally of the harvester with a corresponding bearing 30 on a front post 23. The bearings 30 are braced by the stabilizing members 30'.

Fan shafts 32 are disposed one in each fan housing 24 and each shaft is journaled at its rear end in a bearing 31 and at its front end in a bearing 30. A radial type fan 33 is mounted on each shaft and disposed within the corresponding fan housing 24.

Each fan housing includes a substantially cylindrical portion 35 surrounding the corresponding fan 33, a truncated conical portion 36 secured at its larger end to the front end of the cylindrical portion 35 and extending forwardly from the latter, and a Y-shaped portion 37 extending forwardly from the smaller end of the truncated conical portion 36 and connected in communication with the conical portion 36.

A divider plate or baffle 38 is mounted in substantially vertical position in each Y-shaped portion 37 and converges forwardly from a rear edge 39 of the baffle disposed within the conical portion 36 of the corresponding housing to divide the air blast from the fan 33 into two substantially equal portions directed one through each of the outlet openings in the Y-shaped portion of the housing.

Two air ducts 29 project from each Y-shaped portion 37 and extend forwardly and downwardly therefrom. Each duct includes a rigid tubular portion 40 and a flexible portion 41 connected at its rear end to the front end of the corresponding rigid portion 40 and curved forwardly and downwardly, so that its front end is positioned in front of and above the sickle bar 16. The two rigid duct portions 40 of each pair are disposed in spaced apart and substantially parallel relationship to each other and are convergently curved at their rear ends to join the front end portion of the associated fan housing and the two flexible portions 41 of each pair of ducts are disposed in spaced apart and substantially parallel relationship to each other.

The fans are spaced apart at substantially equal distances longitudinally of the header mechanism and the air duct leading from the front ends of the fans are also spaced apart substantially equal distances longitudinally of the header mechanism and are so closely spaced that the air blast directed rearwardly from the bottom ends of the nozzles 22 will overlap as they reach the sickle bar 16.

The nozzles 22 are carried by each duct 29, the upper end of each nozzle being connected to the front lower end of the flexible portion 41 of the associated duct and each nozzle comprises a hollow metallic body having a substantially circular cross section at its upper end and tapering in thickness while increasing in width from its upper to its lower end.

The nozzles have a width at their lower ends such that they pass easily between the rows of standing grain, such as wheat, and do not bend the grain over or mash it down. Each nozzle is longitudinally curved, so that while its upper portion is substantially vertical when in operative position, its lower portion is substantially horizontal and its open lower end is directed toward the sickle bar of the header mechanism. Each nozzle has a rib 43 extending forwardly from its lower portion substantially at the mid-width location thereof and a shoe 44 extending along the lower edge of the rib 43, the shoe having its rear end disposed adjacent the rear end of the nozzle and extending forwardly substantially horizontally from the bottom or rear end of the nozzle to the front edge of the rib 43, the front end of the shoe being forwardly and upwardly curved, as indicated at 45. Each shoe has a flat bottom surface and these shoes support the corresponding nozzles and protect the nozzles from damage in the event the lower ends of the nozzles come into contact with the ground during the operation of the harvester. The webs and shoes also assist in parting the grain as the nozzles pass through the standing grain, so that the grain is not unduly disturbed by the passage of the nozzles therethrough.

Bars 46 extend forwardly, one from each front post 23 in horizontal position and in spaced apart and substantially parallel relationship to each other. Each of the bars 46 is secured at its rear end to the corresponding front post 23 substantially at the level of the corresponding cross member or brace 28 and is supported in substantially horizontal position by a diagonal brace 47 secured at its lower end to the rear frame member 17 of the grain table and secured at its upper end to the bar 46 intermediate the length of the latter by a suitable slidable connection 48. A link 50 extends forwardly from the front end of each bar 46 and each link 50 is connected at its rear end to the front end of the associated bar 46 by an adjustable connection 51, so that each bar and its associated link constitutes an adjustable length brace extending from the corresponding front post 23 to the flexible portions 41 of the corresponding pair of ducts 29 near the lower front ends of the flexible portions. The links 50 are connected at their front ends to the corresponding flexible portions 41 by suitable collars 52 which extend around and embrace the flexible portions of the ducts intermediate their ends and are connected to the front end of the link 50 by a crossbar 53.

A collar 53' surrounds each duct at the location of the joint between the forward end of the rigid portion 40 and the rearward end of the flexible portion 41 thereof, and this collar is connected to one end of an adjustable length brace 54 which extends rearwardly and downwardly to a connection at its lower end with the structure of the frame 20 near the lower ends of the front posts 23. A collar 55 surrounds the Y-shaped front portion 37 of each fan housing adjacent the front end of the truncated conical portion 36 of the fan housing and an upright brace 56 is connected at its upper end to the collar 55 and at its lower end to the corresponding bar 46 to support the fan housing in position relative to the associated fan 33.

By adjusting the link 50 in a horizontal direction longitudinally of bar 46, the nozzles 24 can be raised and lowered and moved toward and away from the sickle bar 16 and secured in selected positions of adjustment.

Each fan shaft 32, except the one remote from the body 10, is provided inwardly of the corresponding bearing 31 with two belt pulleys, as indicated at 60 and 61, disposed in side by side relationship. The fan shaft 32 remote from the body 10 has a pulley 61 thereon, and V-belts 62 interconnect the corresponding belt pulleys, so that all of the fan shafts are drivingly interconnected.

A transmission unit 63 is mounted on the frame 20 at the end of this frame adjacent the body portion of the harvester and connected by a drive shaft 64 to the mechanism of the thresher portion of the harvester, so that it is driven from the means supplying power to the harvester. A shaft 65 projects from the transmission unit 63 and carries a belt pulley 66 larger than the belt pulleys 62 which belt pulley 66 is drivingly connected to one of the belt pulleys 62 on the fan shaft nearest the transmission unit 63 by a belt 67, so that the fans are all driven simultaneously from the operating mechanism of the harvester.

With this arrangement, each fan directs an air blast through the ducts connected thereto and each duct conducts the air blast through the nozzle connected to the lower front end thereof and the nozzles direct the air blast rearwardly from a position in front of the sickle bar of the header mechanism toward the sickle bar to force the grain into the sickle bar and from the sickle bar onto the conveyor belt of the grain table assembly. A number of relatively narrow nozzles are used, twelve being illustrated in the accompanying drawings, so that the nozzles may pass freely through the standing grain and yet the air blasts from adjacent nozzles will overlap before they reach the sickle bar of the machine, and a corresponding number of air ducts and fans are provided. While it has been found convenient to provide a separate fan for each two air ducts, it is to be understood that this arrangement may also be varied, without in any way exceeding the scope of the invention.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

An attachment for a harvester having a sickle bar, comprising: a frame carried by said harvester; a fan mounted on the frame; an air duct including a rigid stationary duct portion extending forwardly from the fan above the sickle bar and a flexible duct portion connected at one end to the forward end of the rigid portion, and depending from said rigid portion forwardly of the sickle bar; a nozzle carried by the other end of the flexible portion in position to direct air rearwardly toward the sickle bar; a stationary bar extending forwardly from the frame above the sickle bar in a plane intersecting the flexible duct portion intermediate the ends of said flexible portion; a link substantially longitudinally aligned with the bar in said plane and connected to the bar for adjustment in a horizontal direction longitudinally of the bar toward and away from the flexible duct portion; and a collar embracing the flexible duct portion intermediate its ends and carried by the link forwardly and below said one end of the flexible duct portion to effect vertical and horizontal adjustments in the nozzle position responsive to selective positioning of the link relative to said bar.

References Cited in the file of this patent

UNITED STATES PATENTS

| | | |
|---|---|---|
| 689,800 | Hafermehl | Dec. 24, 1901 |
| 1,122,375 | Engle | Dec. 29, 1914 |
| 1,454,071 | Owens | May 8, 1923 |
| 1,794,658 | Walsh | Mar. 3, 1931 |
| 1,900,269 | Altgelt et al. | Mar. 7, 1933 |
| 2,543,833 | Clark | Mar. 6, 1951 |
| 2,670,586 | Phillips | Mar. 2, 1954 |